(12) United States Patent
Kemmerling et al.

(10) Patent No.: US 10,830,127 B2
(45) Date of Patent: Nov. 10, 2020

(54) CRANK DRIVE DEVICE FOR AN INTERNAL COMBUSTION ENGINE, DRIVE TRAIN AND VEHICLE

(71) Applicant: Ford Global Technologies, LLC, Dearborn, MI (US)

(72) Inventors: Joerg Kemmerling, Monschau (DE); Frank Wunderlich, Herzogenrath (DE); Rainer Lach, Wuerselen (DE); Vanco Smiljanovski, Bedburg (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/565,368

(22) Filed: Sep. 9, 2019

(65) Prior Publication Data
US 2020/0080472 A1 Mar. 12, 2020

(30) Foreign Application Priority Data
Sep. 12, 2018 (DE) .................. 10 2018 215 490

(51) Int. Cl.
*F02B 69/06* (2006.01)
*F02D 39/02* (2006.01)
*F01L 1/344* (2006.01)

(52) U.S. Cl.
CPC .............. *F02B 69/06* (2013.01); *F01L 1/344* (2013.01); *F02D 39/02* (2013.01); *F02B 2700/02* (2013.01)

(58) Field of Classification Search
CPC ............ F01L 1/34409; F01L 2820/042; F02D 41/009; F02D 2041/0092; F02D 39/02; F02B 69/06
See application file for complete search history.

(56) References Cited

U.S. PATENT DOCUMENTS

| | | | |
|---|---|---|---|
| 5,494,008 A * | 2/1996 | Ohkawa .............. | F01L 1/34406 123/90.15 |
| 5,927,236 A | 7/1999 | Gonzalez | |
| 6,006,619 A | 12/1999 | Gindentuller et al. | |
| 9,726,075 B2 | 8/2017 | Arnold et al. | |
| 2003/0019448 A1* | 1/2003 | Aoyama ................. | F01L 1/024 123/90.16 |
| 2006/0122766 A1* | 6/2006 | Schueler ................. | F02D 35/02 701/114 |
| 2007/0078040 A1* | 4/2007 | Nobumoto ............ | F02D 41/042 477/70 |
| 2007/0144473 A1* | 6/2007 | Nakamura .......... | F01L 13/0026 123/90.16 |
| 2013/0005523 A1* | 1/2013 | Suchecki ................ | F01L 1/022 474/101 |

(Continued)

FOREIGN PATENT DOCUMENTS

JP 2017218919 A 12/2017
JP 2017227138 A 12/2017

*Primary Examiner* — Long T Tran
(74) *Attorney, Agent, or Firm* — Geoffrey Brumbaugh; McCoy Russell LLP

(57) ABSTRACT

A crank drive device for an internal combustion engine which comprises a crankshaft configured to be eccentrically connected to a connecting rod of a piston and to drive the drive shaft. The crankshaft is eccentrically connected to the camshaft and is rotatably supported with respect to the camshaft. An auxiliary motor which is configured to rotate the rotatable eccentric system.

16 Claims, 3 Drawing Sheets

(56) References Cited

U.S. PATENT DOCUMENTS

| | | | |
|---|---|---|---|
| 2014/0137843 A1* | 5/2014 | Van Avermaete | F01M 11/02 123/48 B |
| 2014/0329630 A1* | 11/2014 | Williams | F16H 7/02 474/150 |
| 2016/0244064 A1 | 8/2016 | Teraya et al. | |
| 2017/0159560 A1 | 6/2017 | Fluhler | |
| 2020/0011252 A1* | 1/2020 | Sato | F01L 1/352 |

* cited by examiner

CRANK DRIVE DEVICE FOR AN INTERNAL COMBUSTION ENGINE, DRIVE TRAIN AND VEHICLE

CROSS REFERENCE TO RELATED APPLICATION

The present application claims priority to German patent application No. 102018215490.2, filed on Sep. 12, 2018. The entire contents of the above-listed application are hereby incorporated by reference for all purposes.

FIELD

The present description relates generally to a crank drive device for an internal combustion engine, a drive train for a vehicle which has an internal combustion engine having such a crank drive device and a vehicle having such a drive train or such a crank drive device.

BACKGROUND/SUMMARY

Motor vehicles may have drive train systems including an internal combustion engine or an electric motor/electric engine for driving the vehicle. Hybrid vehicles or hybrid electric vehicles have both an internal combustion engine and an electric engine which can each give an output torque to a drive shaft of the vehicle in order to propel the vehicle. Depending on the current operating situation, the internal combustion engine or the electric engine supplies the output torque. Many vehicles also provide for parallel hybrid operation in which at least temporarily the internal combustion engine and the electric engine simultaneously contribute a proportion to the overall output torque.

Drive trains, such as for hybrid vehicles and vehicles having a parallel hybrid configuration, contain internal combustion engines in which the efficiency of the operation is intended to be optimized based on factors different from those of motor vehicles with only an internal combustion engine.

Internal combustion engines, such as Otto engines or diesel engines, are configured to keep their operating point in an efficient range over a wide range of the ratio of speed relative to load of the engine. This requires compromises with simultaneous optimization of different design parameters, such as, the compression ratio, the dimensions which can be mechanically produced, the valve drive, the compression system, etcetera, whereby the peak efficiency which can be achieved is influenced.

Drive trains, especially for hybrid vehicles, such as for vehicles having a parallel hybrid configuration, may in contrast be configured to operate efficiently only in a narrowly limited range of the ratio of speed relative to the load of the engine. This narrow range of operation allows for potentially increased efficiency of operation.

JP 2017218919 A sets out an internal combustion engine which is operated in accordance with an Atkinson cycle and in which the compression rate is varied. US 2017/0159560 A1 sets out a hypercycloid gear mechanism by means of which strokes can be lengthened and shortened in an internal combustion engine. U.S. Pat. No. 5,927,236 also sets out a mechanism by means of which the stroke lengths may be variable in an internal combustion engine. In this instance, the mechanism is produced with gear mechanisms in which the engine block has fixed toothed wheels around which movable toothed wheel rings with internal teeth revolve. JP 2017227138 A also sets out an internal combustion engine which is operated in accordance with the Atkinson principle, wherein the compression rate can be varied with a phase conversion motor. U.S. Pat. No. 9,726,078 B2 ('078) sets out an internal combustion engine which can be operated in accordance with the Atkinson principle and which produces shortened intake and compression strokes and lengthened expansion and exhaust strokes using toothed gear mechanisms in the crank drive. Application '078 describes that phase angle changes can be brought about and the compression and expansion rates can thereby be varied via yet another additional gear mechanism which is constructed as a worm gear, using an additional motor.

The implementation of a stroke cycle, in which the individual strokes have different lengths, and in particular the intake and expansion strokes are lengthened, requires in most cases complex mechanical gear devices, which may bring about additional friction losses, become worn and be prone to failure. These complex systems may have an adverse effect on the efficiency and reliability of hybrid vehicles whose internal combustion engines are operated in an irregular manner and under some conditions with a more non-uniform load, in contrast to vehicles whose drive trains each have a single engine.

However, the inventors herein have recognized potential issues with systems such as those described above. As one example, the engines are not optimized for efficiency and reliability based on the conditions of hybrid vehicles.

An object of the application is to provide systems and methods for operating internal combustion engines in a hybrid vehicle in a more reliable and efficient manner.

In one example, the issues described above may be addressed by a system comprising a crank drive device for an internal combustion engine comprises a crankshaft, a camshaft and a drive shaft for providing an output torque. In this instance, the crankshaft is configured to be eccentrically connected to a connecting rod of a piston of an internal combustion engine in a rotatably supported manner and to drive the drive shaft. In addition, the drive shaft and the camshaft are components of a rotatable eccentric system, in which the crankshaft is eccentrically connected to the camshaft and is rotatably supported with respect to the camshaft. Furthermore, the crank drive device has an auxiliary motor which is configured to rotate the rotatable eccentric system in a manner synchronized with a stroke cycle of the internal combustion engine.

In this way, the eccentric connections of crank shaft and auxiliary motor allow the engine to be operated in a more efficient stroke cycle as will be described in further detail below.

The rotatable eccentric system is rotated by the auxiliary motor, that is to say, it drives the system for rotation during the operating time of the internal combustion engine and serves not only to carry out a configuration adjustment of the eccentric system. During rotation of the eccentric system, one of the two eccentrically connected shafts rotates about the rotation axis of the other. The term "eccentrically connected" includes the case that the rotation axes about which the shafts can rotate themselves may be parallel with each other, but are displaced in a manner parallel with respect to each other and are not located one on the other. A crankshaft is connected to the camshaft and is rotatably supported allows for a direction connection between the crankshaft and camshaft in contrast to a connection via a toothed wheel gear mechanism.

The rotation of the rotatable eccentric system in a manner synchronized with the stroke of the internal combustion engine enables strokes of the internal combustion engine to be lengthened and shortened. The driving of the system by means of an auxiliary motor enables direct control of the rotatable eccentric system without toothed wheel gear shifts having to be provided for this purpose and without a corresponding mechanism having to be provided for this purpose for the energy supply via the connecting rod of the piston of the internal combustion engine. In this manner, there can be provided a very simple, robust crank drive device which nonetheless can be precisely adapted by means of the correspondingly adapted operation of the auxiliary motor to any operating situation so that the internal combustion engine can be operated with maximum efficiency in the respective operating situation.

In an embodiment, the crank drive device comprises a control device which is configured to control the auxiliary motor in such a manner that the auxiliary motor drives and brakes the rotatable eccentric system for rotation in a manner synchronized with an Atkinson stroke cycle of the internal combustion engine. The Atkinson stroke cycle is, in the same manner as, for example, the Otto stroke cycle, a stroke cycle of a four-stroke internal combustion engine. Whilst all strokes are substantially uniform in the Otto stroke cycle, they differ in the Atkinson cycle since a different piston stroke and consequently differently different volumes for the "intake" and "compression" strokes, on the one hand, and "expansion" and "exhaust" strokes, on the other hand, are produced, wherein "expansion" and "exhaust" are lengthened with respect to "intake" and "compression." This is enabled by means of changed valve opening times, on the one hand, and a crank drive which is changed with respect to an Otto engine in that the piston during expansion travels further downward than during intake. The degree of thermal efficiency and consequently the efficiency is thereby increased since the gas which expands in the piston can expand and relax to a greater extent and cools more significantly. Under some circumstances, Atkinson cycles are also referred to with Otto engines if only the valve closure times are selectively delayed. However, the crank drive device in some described embodiments enables a change of the piston stroke and enables an Atkinson cycle process to be carried out. The engine is therefore an Atkinson engine/motor. The change of the movement of the connecting rod and consequently of the piston is enabled by means of the crank drive with the described rotatable eccentric system. In this case, complex gear mechanisms which may be prone to defects, wear and friction losses, such as toothed wheel drives or other wheel mechanisms, are not required for movement control. Instead, the rotatable eccentric system may be directly driven or braked in a synchronized manner by the auxiliary motor with the respective stroke lengths depending on the current stroke.

In an embodiment, the auxiliary motor is configured to drive the rotatable eccentric system in such a manner that the camshaft rotates about itself at half the speed at which the crankshaft rotates about itself. In other words, the crankshaft may rotate half as quickly about the camshaft as about itself, which may also be described to as the time in which the crankshaft is rotated once about the camshaft it has rotated twice about itself. This rotation may further be described as the piston in the cylinder of moves back and forth between a top dead center and a bottom dead center with each half rotation of the crankshaft. Consequently, during a single rotation of the camshaft a stroke cycle with all four strokes can be carried out.

The auxiliary motor facilitates driving, accelerating and braking the rotatable eccentric system such that the rotation is carried out in a manner synchronized with the stroke cycles of the internal combustion engine. During the intake and exhaust, the auxiliary motor drives the rotatable eccentric system accordingly, whilst during the compression and expansion it brakes the rotatable eccentric system. In this manner, it is facilitated that the synchronization is maintained and the camshaft continues to rotate at half the speed of the crankshaft.

In an embodiment, the auxiliary motor is configured to rotate the camshaft of the rotatable eccentric system. The eccentric system can be rotated by the auxiliary motor directly acting on the camshaft in order to drive it whilst the piston of the internal combustion engine acts on the camshaft via the connecting rod. The camshaft, which may be eccentrically driven by the connecting rod, is thereby prevented from also having to be connected to the auxiliary motor so that the camshaft may be fixed in position and, may be driven for rotation by means of a similarly fixed rotationally symmetrical auxiliary motor.

In an embodiment, the auxiliary motor is an electric motor. The electric motor suitable for driving an axle for rotation in a simple manner. In addition, the availability of electrical energy in use with a hybrid vehicle and electrical energy stores for supplying the electric engine of the drive train does not interfere with use of other systems. As a result of the use of an electric motor as an auxiliary motor, the internal combustion engine described may also be referred to as a hybrid internal combustion engine or hybrid combustion engine.

In an exemplary embodiment of the crank drive device, the camshaft has a region which forms a rotor of the electric motor. In this manner, the torque transmission to the camshaft can be produced by the auxiliary motor without a gear mechanism, such as with toothed wheels, or a fixed mechanical connection of the auxiliary motor to the rotatable eccentric system. Embodiments without gear mechanisms or other fixed mechanical connections increase robustness of the described crank drive and increase the efficiency due to prevention and reduction of friction losses.

In an exemplary embodiment, the crank drive device comprises a recuperation energy storage device for storing electrical energy. An electric motor is configured, in the event of braking of the rotatable eccentric system, to produce electrical energy and to direct it into the recuperation energy storage device. The braking may be produced as a recuperation braking operation in which the electric motor acts as a generator or dynamo. In this manner, the brake energy used when braking the rotatable eccentric system is at least partially converted into a form of energy which can be stored and subsequently reused so that the efficiency and degree of effectiveness of the hybrid internal combustion engine is increased. The recuperation energy storage device may be a store such as an accumulator. The storage device may be already provided in hybrid or electric vehicles which include components such as electric drives and accumulators or rechargeable batteries. As a result of the comparatively low quantity of charging and short time in which the charge state has to be maintained, but, on the other hand, the possibly rapid reaction or charging time, the recuperation energy storage device may comprise an appropriately sized capacitor or capacitors.

In an exemplary embodiment, the recuperation energy storage device comprises a super-capacitor or a super-capacitor device having at least one super-capacitor. Super-capacitors are electrochemical capacitors and represent a development of the dual-layer capacitors. They are suitable for use in a recuperation energy storage device since they are suitable for procedures with a very large number of charging and discharging cycles and as a result of their very high power density (with low energy density in comparison with accumulators) can be very quickly charged and discharged. In this manner, a large portion of the brake energy of the auxiliary motor can be recovered and used again. Capacitors may also have a weight advantage with respect to accumulators so that the efficiency of the hybrid internal combustion engine is further increased.

In an embodiment, there may be provision for the electrical energy which is directed into the recuperation energy storage device to be used for the operation of other consumers of the vehicle. In another embodiment the auxiliary motor is configured to draw at least a portion of the energy for driving the rotatable eccentric system from the recuperation energy storage device. To this end, a suitable circuit is provided, which may also be combined with control by the control device of the auxiliary motor or another control device. In this manner, during the braking, electrical energy which is produced during the compression and expansion strokes and which has been stored in the recuperation energy storage device, can be supplied to the auxiliary motor again during the intake and exhaust strokes.

In an embodiment, the crank drive device comprises a wheel gear, via which the drive shaft can be driven by means of the crankshaft. In this instance, the wheel gear may be a simple toothed gearing, such as a toothed ring on the crankshaft which engages in another toothed ring on the drive shaft so that a simple, robust possibility is provided to transmit the output torque to the drive shaft.

In an embodiment of the crank drive device, the drive shaft has at least one region in which the drive shaft has a hollow space and the camshaft has a pivot pin region, by means of which the camshaft protrudes into the hollow space of the drive shaft. In this manner, a compact construction type with few components is enabled and at the same time a precise orientation of the camshaft with the drive shaft is facilitated.

According to another embodiment of the application, a drive train for a vehicle is provided, wherein the drive train comprises at least one internal combustion engine which has at least one cylinder having a piston having a connecting rod and a crank drive device which has a crankshaft, a camshaft and a drive shaft for providing an output torque, wherein the crankshaft is eccentrically connected to the connecting rod in a rotatably supported manner. The crank drive device may include one or more of the characteristics described above. In this manner, advantages and specific features of the crank drive device according to the application are also implemented in the context of a drive train for a vehicle.

In an embodiment, the drive train further comprises an electric motor configured to provide an additional output torque. Consequently, there is provided a suitable drive train for a hybrid vehicle, in which the internal combustion engine may operate advantageously in accordance with the Atkinson principle.

In an exemplary embodiment, the drive train is configured to at least temporarily provide in a parallel manner the additional output torque together with the output torque of the electric motor via the drive shaft. Consequently, there is provided a drive train which produces a parallel/hybrid configuration for which an Atkinson internal combustion engine may be suitable.

According to a further embodiment of the application, there is additionally provided a vehicle comprising a drive train with one or more of the characteristics described above. In this manner, advantages and specific features of described crank drive devices or drive trains are implemented in a suitable vehicle. The output torque may drive the wheels of the vehicle in order to propel it. The vehicle may be a motor vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Other advantages of the present application will be appreciated from the detailed description and the drawings. The application is explained in greater detail below in connection with the following description of embodiments with reference to the appended drawings.

Of course, other embodiments can be used and structural or logical changes can be carried out without departing from the protective scope of the present application. Of course, the features of the different exemplary embodiments described above and below can be combined with each other unless specifically stated otherwise. The description is therefore not intended to be interpreted in a limiting sense, and the protective scope of the present application is defined by the appended claims.

BRIEF DESCRIPTION OF THE DRAWINGS

FIGS. 1-3 are shown approximately to scale

DETAILED DESCRIPTION

Figure 1:
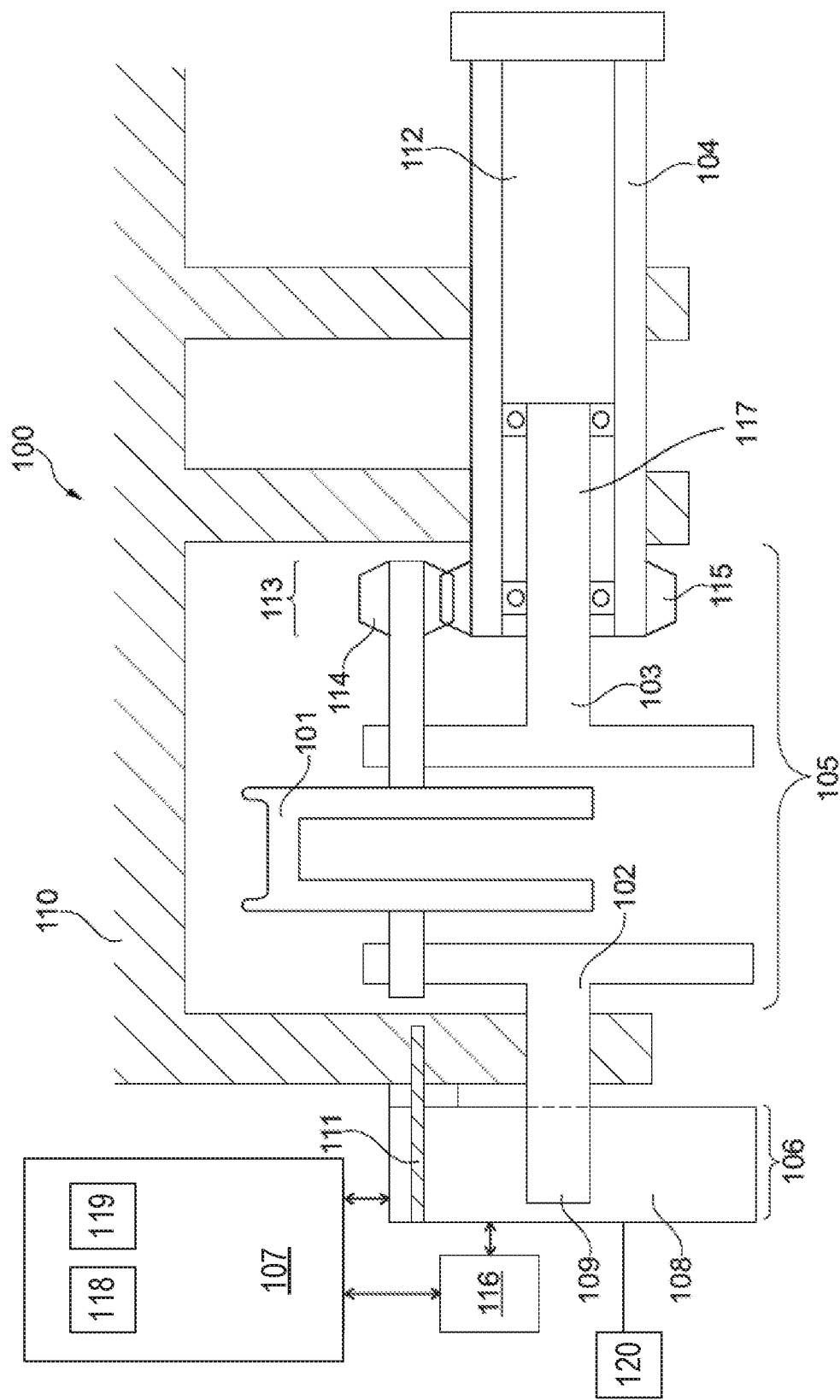
FIG. 1 is a schematic illustration of an embodiment of a crank drive device for an internal combustion engine.
Figure 2:
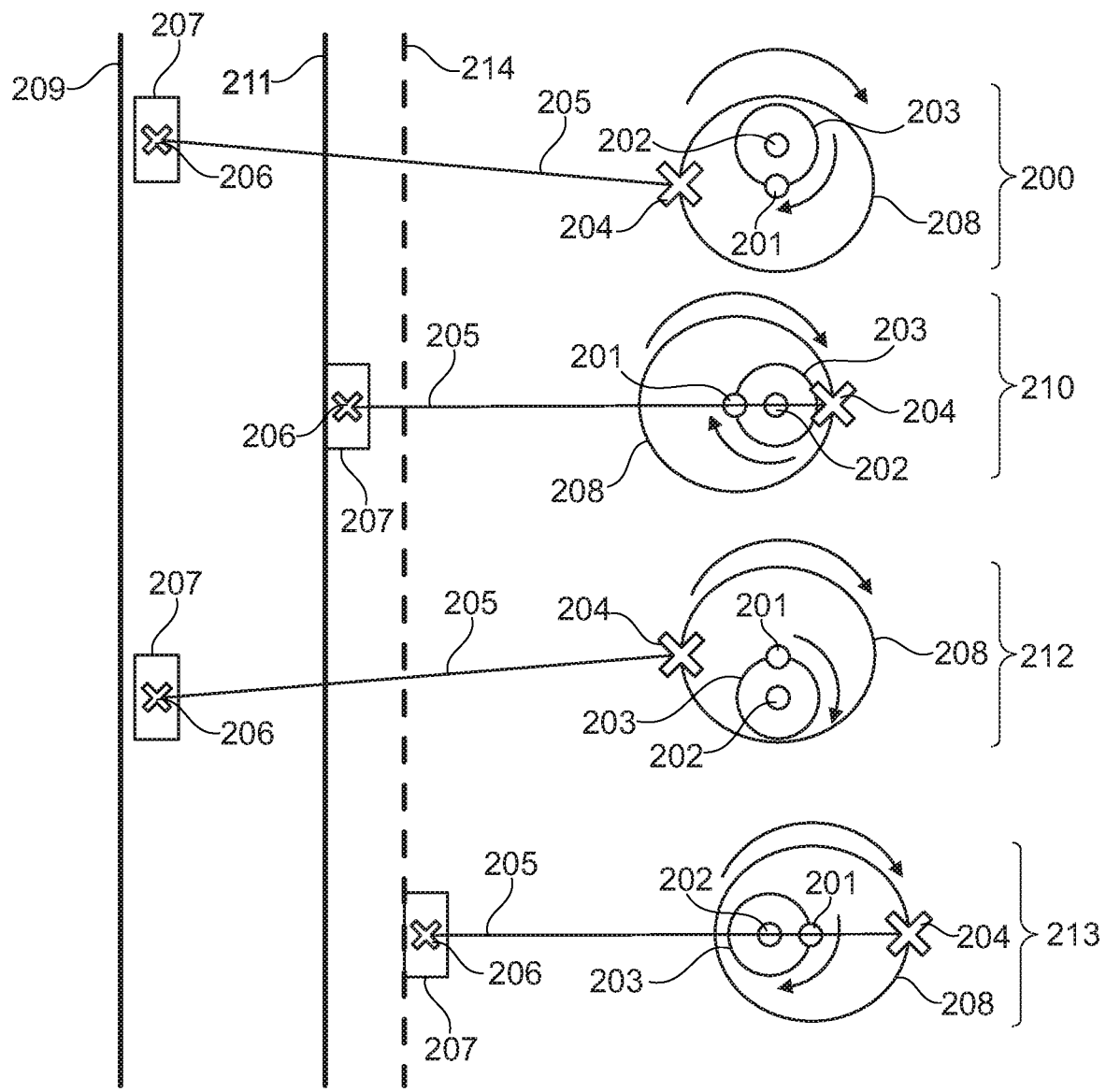
FIG. 2 is a schematic illustration of an embodiment of operating states of a rotatable eccentric system of a crank drive device for an internal combustion engine.
Figure 3:
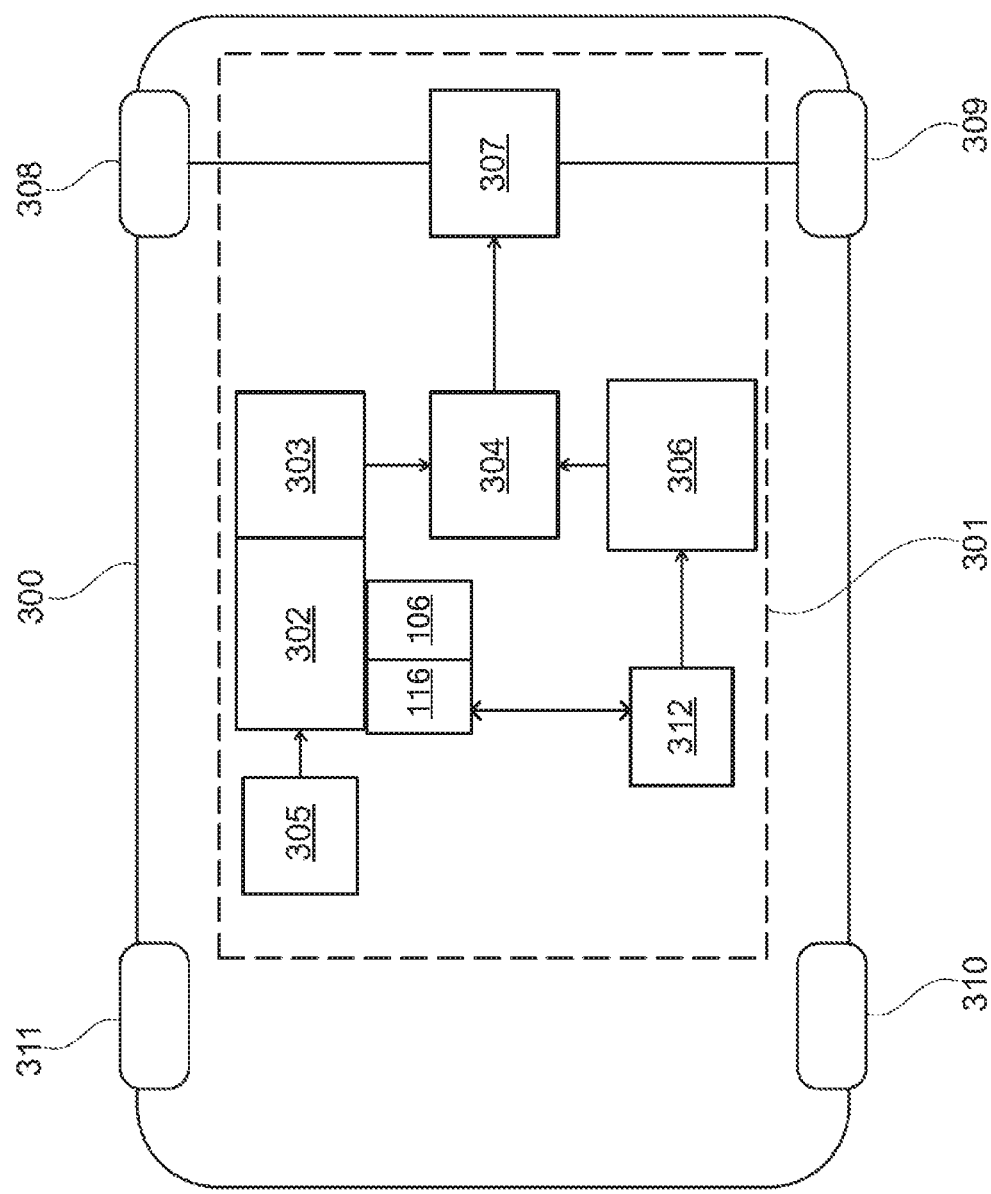
FIG. 3 is a schematic illustration of a vehicle with a drive train according to an embodiment.

The following description relates to systems and methods of operation of a crank device which may utilize eccentric connections and an auxiliary motor to increase operational efficiency. The eccentric connections and auxiliary motor may be used to operate the engine in efficient stroke cycles and recuperate energy from rotation. FIG. 1 shows an embodiment of a system including the eccentric connection and auxiliary motor. FIG. 2 shows rotation of an embodiment of system components through various operational states. FIG. 3 shows an embodiment of a vehicle including an internal combustion engine and electric motor.

In FIG. 1, a schematic illustration of an embodiment of a crank drive device is depicted. The crank drive device 100 has a crankshaft 101, a camshaft 102, 103, and a drive shaft 104. The drive shaft 104 provides an output torque. The output toque may be used for driving a vehicle containing an internal combustion engine. The crankshaft 101 is configured to be eccentrically connected in a rotatably supported manner to a connecting rod of a piston and to drive the drive shaft 104. The crankshaft 101 and the camshaft 102, 103 are components of a rotatable eccentric system 105 in which the crankshaft 101 is eccentrically connected to the camshaft 102, 103 and is rotatably supported with respect to the camshaft 102, 103. Rotatably supported includes methods of supporting a component while allowing the component to rotate. An example of rotatable support is a bearing support. In addition, the crank drive device 100 has an auxiliary motor 106. The auxiliary motor 106 may be used rotate the rotatable eccentric system 105 in a manner synchronized with a stroke cycle of the internal combustion engine. In other words, the auxiliary motor 106 may be used to affect the rotation of the rotatable eccentric system 105 and therefore affect the stroke cycle of a piston. In one example, the auxiliary motor 106 is used to affect the timing of a piston such that stroke cycle operates in an Atkinson cycle.

An embodiment of the crank drive device 100 additionally has a control device 107 which is configured to control the auxiliary motor 106 in such a manner that the auxiliary motor 106 drives and brakes the rotatable eccentric system 105. The driving and braking of via the auxiliary motor 106 may be used to rotate the rotatable eccentric system 105 in a manner synchronized with an Atkinson stroke cycle. For example, the auxiliary motor 106 drives the rotatable eccentric system 105 in such a manner that the camshaft 102, 103 rotates about a camshaft rotation axis at half the speed at which the crankshaft 101 rotates about a crankshaft rotation axis.

In an embodiment, the auxiliary motor 106 rotates the rotatable eccentric system 105 by directly rotating the camshaft 102, 103. The auxiliary motor 106 may be constructed as an electric motor which comprises a stator 108 and a rotor 109. The stator 108 is securely fitted to a housing 110 of the crank drive device 100. In FIG. 1, the stator 108 secured with a support 111 to the housing. The rotor 109 of the electric motor may be constructed as an end region of the camshaft 102, 103 so that the camshaft 102, 103, without an additional wheel mechanism being required, is driven directly by the auxiliary motor 106. The other end region or pivot pin region 117 of the camshaft 102, 103 may be rotatably arranged in a fixed manner in a hollow space 112 of the drive shaft 104 enabling precisely orientated, compact construction. The crankshaft 101 may be arranged in such a manner that it can rotate on a circular path about the camshaft 102, 103. In order to transmit the output torque to the output shaft 104, the crank drive device 100 may have a wheel gear 113 via which the drive shaft 140 can be driven by the crankshaft 101. A region of the crankshaft may be surrounded by a toothed ring 114 whose teeth engage in another toothed ring 115 which surrounds a region of the drive shaft 104. The rotation speed of the drive shaft 104 may thus be consequently produced as a rotation speed of the camshaft 102, 103 plus the speed of the crankshaft 101 divided by the transmission ratio of the wheel gear 113.

The auxiliary motor 106 may be constructed in FIG. 1 as an electric motor. For power supply, for example, a connection to a power source and/or storage device 120 may be provided. Additionally or alternatively, in the embodiment shown a recuperation energy storage device 116 for storing electrical energy in the event of braking of the rotatable eccentric system 105 and consequently of the camshaft 102, 103 is provided. The auxiliary motor 106 is used as a generator and produces electrical energy which is directed into the recuperation energy storage device 116. The energy storage device 116 may have at least one super-capacitor which can be rapidly charged. The auxiliary motor 106 may then draw, during phases in which the camshaft 102, 103 is not braked but instead driven, at least a portion of the energy for driving the camshaft 102, 103 and the rotatable eccentric system 105 from the recuperation energy storage device 116. The process of switching between braking and driving of the camshaft may be controlled by the control device 107. The control device may comprise a processor 118 and memory 119 storing instructions for controlling connected components.

Embodiments of a crank drive device 100 may be used to produce an Atkinson cycle with a short intake stroke and long expansion stroke of an internal combustion engine. Such embodiments of a crank drive device 100 may include only a minimal number of retention members and wheel mechanisms and consequently a low mechanical complexity, whereby the system may have increased robustness and reliability. In addition, simple control of the auxiliary motor enables the rotatable eccentric system 105 to be controlled in a manner synchronized with the strokes of the internal combustion engine. Embodiments of system may specifically be formed without components of conventional systems, such as gears, in order to produce the increased reliability.

In FIG. 2, operating states of a rotatable eccentric system of a crank drive device according to an embodiment which is operated in accordance with the Atkinson principle are schematically illustrated. Other embodiments may not be operated in accordance with the Atkinson principle. A rotation axis of the crankshaft 201, which is connected eccentrically to the camshaft in a rotatably supported manner, moves about the rotation axis of the camshaft 202 on a first circular path 203. A first end 204 of the connecting rod 205 may be eccentrically connected to the camshaft in a rotatably supported manner. The first end may be wider than a second end. The second end 206 of the connecting rod 205 may be connected to a piston 27 in a cylinder of the internal combustion engine. The second end 206 may move on a second circular path 208 about the rotation axis of the crankshaft 201. The rotations of the crankshaft and the camshaft are carried out in this instance in the same rotation direction, in the example shown in a clockwise direction. In FIG. 2, the rotation directions are indicated with curved arrows. In some embodiments, the crankshaft rotates twice as fast about the rotation axis 201 of the crankshaft as the rotation axis of the crankshaft 201 rotates about the rotation axis of the camshaft 202. In other embodiments, the crankshaft rotates around the crankshaft rotation axis 201 at a first speed, the crankshaft rotates about the camshaft rotation axis 202 at a second speed, and the second speed is twice as fast as the first speed.

In the first operating state 200 shown, which represents the beginning of the intake stroke, the crankshaft is in a position in which the first end 204 of the connecting rod 205 and consequently the piston 207 are located at the top dead center, illustrated by the TDC line 209 (TCD—top dead center), whilst the rotation axis of the crankshaft 201 is located in a central position with respect to the rotation axis of the camshaft 202.

During the intake stroke, which ends in the second operating state 210 shown, in which the piston is then in the first bottom dead center position which belongs to the intake stroke and which is illustrated by the first BDC line 211 (BDC—bottom dead center), the crankshaft rotates by 180° about the crankshaft rotation axis 201 and at the same time this rotation axis of the camshaft 201 rotates through an angle of 90° about the rotation axis of the camshaft 202 until the position of the first bottom dead center is reached. A first instance of bottom dead center may be relatively close to the top dead center, that is to say, the intake cycle is relatively short and the intake volume in the cylinder of the internal combustion engine is relatively small.

During the following compression stroke, which ends in the third operating state 212, the crankshaft rotates a further 180° about the crankshaft rotation axis 201, whilst the rotation axis of the crankshaft 201 rotates at the same time again through an angle of 90° about the rotation axis of the camshaft axis 202 and thus reaches a central position again. It is thereby possible for the compression stroke to again bring the piston 207 into the same top dead center position as during the intake stroke, illustrated by the TDC line 209.

Ignition of the compressed gas/fuel mixture in the cylinder is followed by the expansion stroke which ends in a fourth operating state 213. During the expansion or operating stroke, the ignited gas/fuel mixture expands and the crankshaft rotates by 180° about the individual rotation axis 201. At the same time, the rotation axis of the crankshaft 201 rotates again through an angle of 90° about the rotation axis of the camshaft 202 and consequently the piston 207 rotates into the second bottom dead center position thereof, illustrated by the second BDC line 214. Since in the fourth operating state 213 at the same time the rotation axis of the crankshaft 201 is located at the bottom dead center thereof with respect to the camshaft and the first end 204 of the connecting rod 205 is located with respect to the crankshaft at the bottom dead center thereof, the second bottom dead center of the piston 207, illustrated by the second BDC line 214, is located further away from the top dead center, illustrated by the TDC line 209, than the first BDC line 211 of the first bottom dead center of the piston 207. Therefore, an expansion stroke which is extended in comparison with the intake stroke and compression stroke is achieved.

The transition from the fourth operating state 213 illustrated to the first operating state 200 again then describes the exhaust stroke, in which the combustion residues, in a stroke which is as long as the expansion stroke, are urged out of the cylinder of the internal combustion engine before the operation is continued with the next intake stroke.

The movement described is, on the one hand, carried out by the drive of the crankshaft by the piston during the expansion stroke and, on the other hand, by the drive, for example, of the camshaft by an auxiliary motor.

FIG. 3 depicts an embodiment of a vehicle having a drive train. The embodiment of the vehicle 300 may be a hybrid vehicle in a parallel configuration which has a drive train 301 in which an internal combustion engine 302 is connected to a crank drive device 303 so that the internal combustion engine 302 can be operated in an efficient manner in accordance with the Atkinson principle. The internal combustion engine 302 may include auxiliary motor 106 and recuperation energy storage device 116, all of which may be connected to a battery 312. The drive shaft of the crank drive device 303 transmits an output torque to a first gear mechanism 304. The internal combustion engine 302 is supplied with fuel by means of a tank or fuel store 305. The drive train 301 of the vehicle 300 shown additionally has an electric engine 306 which supplies an additional output torque to the first gear mechanism 304 so that it can transmit an overall torque via a second gear mechanism 307 to at least one of the four wheels 308, 309, 310, 311 of the vehicle 300, in the embodiment shown to two wheels 308, 309. The electric engine 306 is in the embodiment shown connected to at least one battery 312 for supply with electrical energy.

The crank drive device 303 may have an embodiment of a rotatable eccentric system and auxiliary motor, which is possibly an electric auxiliary motor, and which as a result of a large expansion stroke in relation to the intake stroke enables a maximized thermal peak efficiency, enables the internal combustion engine 302 to be operated in combination with the electric engine 306 in such a manner that a high degree of efficiency is achieved.

In this way, the embodiments of a crank device as described herein allow for more efficient operation of an internal combustion engine. The engine may be operated in an Atkinson cycle which is more efficient in comparison to conventional operations. The efficiency may be further increased by recuperating energy during a braking of a camshaft and using the recuperated energy during a driving of the camshaft. The increased efficiency may be further amplified when embodiments of a crank device as described herein are applied in a vehicle with an electric motor in a parallel configuration. This configuration allows for the internal combustion engine to be operated under efficient conditions and recuperated energy to be stored and utilized to further increase efficiency. Therefore, some of the technical effects of applying a crank device as described herein is to allow operation of an internal combustion engine in a more efficient regime and allow recuperation of energy during braking of a cam shaft.

The figures are not necessarily true to detail and true to scale and may be illustrated in an enlarged or reduced state in order to provide a better overview. Therefore, the functional details disclosed here are not intended to be understood to be limiting, but instead only as an illustrative basis which provides the person skilled in the art in this technical field with guidance in order to use the present application in a varied manner.

Although the application has been illustrated and described in greater detail by the embodiments, the application is not limited by the disclosed examples and other variations can be derived therefrom by the person skilled in the art without departing from the protective scope of the application. The application is therefore not intended to be limited to individual embodiments, but instead only by the appended claims.

FIGS. 2-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A crank drive device for an internal combustion engine comprising:
   a crankshaft;
   a camshaft; and
   a drive shaft for providing an output torque, wherein
   the crankshaft is configured to be eccentrically connected to a connecting rod of a piston of an internal combustion engine in a rotatably supported manner and to drive the drive shaft, the crankshaft and the camshaft are components of a rotatable eccentric system, in which the crankshaft is eccentrically connected to the camshaft and is rotatably supported with respect to the camshaft, and
   the crank drive device further has an auxiliary motor which is configured to rotate the rotatable eccentric system in a manner synchronized with a stroke cycle of the internal combustion engine.

2. The crank drive device of claim 1, further comprising a control device which is configured to control the auxiliary motor in such a manner that the auxiliary motor drives and brakes the rotatable eccentric system for rotation in a manner synchronized with an Atkinson stroke cycle of the internal combustion engine.

3. The crank drive device of claim 1, wherein the auxiliary motor is configured to drive the rotatable eccentric system in such a manner that the camshaft rotates about itself at half the speed at which the crankshaft rotates about itself.

4. The crank drive device of claim 1, wherein the auxiliary motor is configured to rotate the camshaft of the rotatable eccentric system.

5. The crank drive device of claim 1, wherein the auxiliary motor is an electric motor.

6. The crank drive device of claim 5, wherein the camshaft has a region which forms a rotor of the electric motor.

7. The crank drive device of claim 5, comprising a recuperation energy storage device for storing electrical energy and wherein the electric motor is configured, in the event of a braking of the rotatable eccentric system, to produce electrical energy and to direct it into the recuperation energy storage device.

8. The crank drive device of claim 7, wherein the recuperation energy storage device comprises a super-capacitor.

9. The crank drive device of claim 7, wherein the auxiliary motor is configured to draw at least a portion of the energy for driving the rotatable eccentric system from the recuperation energy storage device.

10. The crank drive device of claim 1, comprising a wheel gear, via which the drive shaft can be driven by the crankshaft.

11. The crank drive device of claim 1, wherein the drive shaft has at least one region in which the drive shaft has a hollow space and the camshaft has a pivot pin region, and the pivot pin region of the camshaft protrudes into the hollow space of the drive shaft.

12. A drive train for a vehicle comprising:
    an internal combustion engine which has at least a piston having a connecting rod;
    a crank drive device which has a crankshaft, a camshaft, and a drive shaft for providing an output torque, the crankshaft eccentrically connected to the connecting rod in a rotatably supported manner, and the crankshaft eccentrically connected to the camshaft; and
    an auxiliary motor configured to rotate the crankshaft and the camshaft, and the rotation synchronized with a stroke cycle of the internal combustion engine.

13. The drive train of claim 12, further comprising an electric motor which is configured to provide an additional output torque.

14. The drive train of claim 13 configured to provide the additional output torque of the electric motor in a parallel manner to the internal combustion engine.

15. A vehicle comprising an electric motor and a drive train of claim 12.

16. A crank drive device for an internal combustion engine comprising:
    a crankshaft connected to a drive shaft and eccentrically connected to a connecting rod of a piston, the crankshaft eccentrically connected to a camshaft and rotatably supported with respect to the camshaft; and
    an auxiliary motor configured to rotate the crankshaft and the camshaft, and the rotation synchronized with a stroke cycle of the internal combustion engine.

* * * * *